Nov. 5, 1968   L. R. HELLER   3,408,680
WINDSHIELD WIPER ASSEMBLIES
Filed Jan. 28, 1966   2 Sheets-Sheet 1

INVENTOR.
LOTHAR R. HELLER
BY~ Church & Rogers
PATENT AGENTS

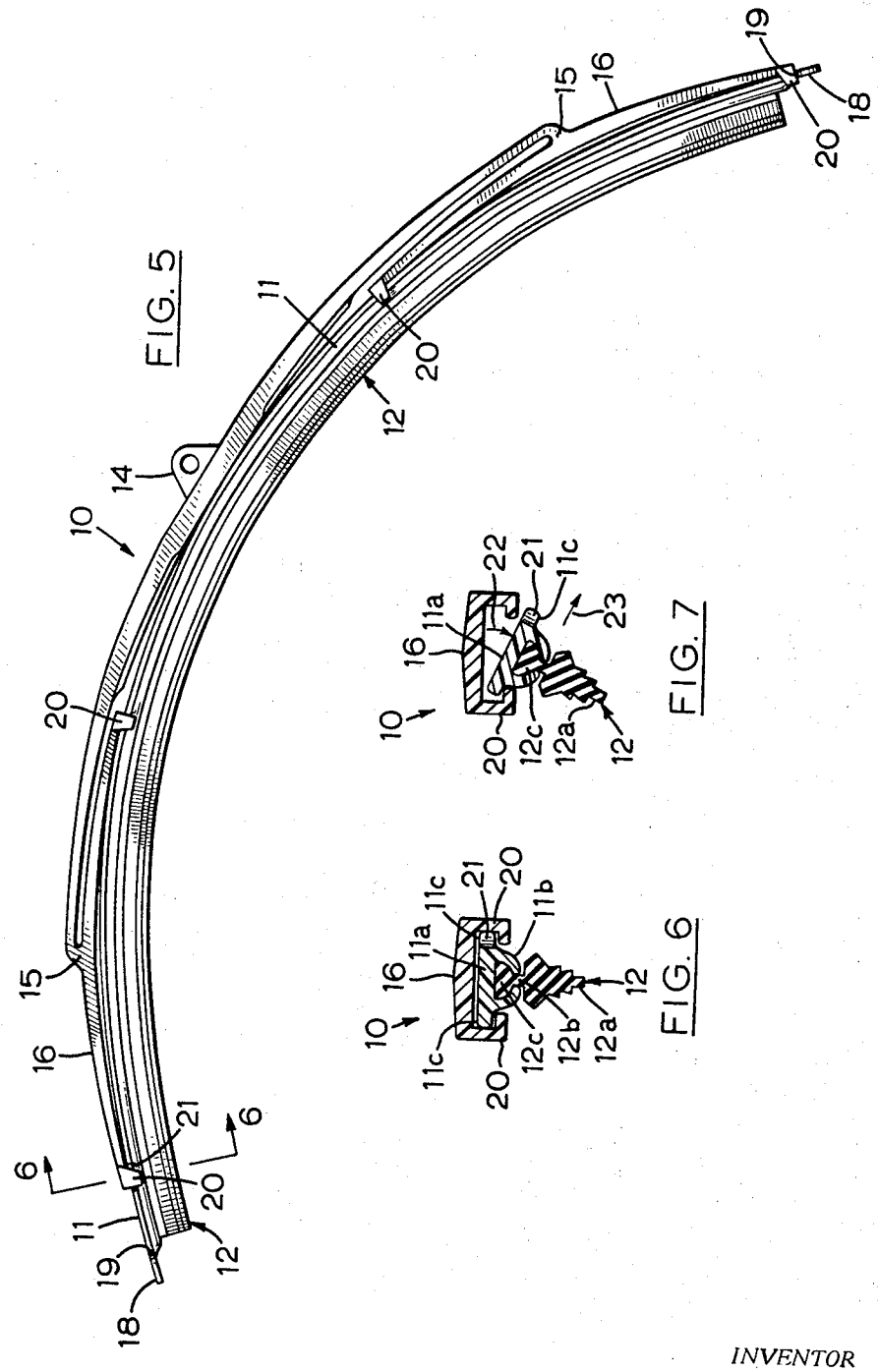

… … …

United States Patent Office 3,408,680
Patented Nov. 5, 1968

3,408,680
WINDSHIELD WIPER ASSEMBLIES
Lothar R. Heller, Stoney Creek, Ontario, Canada, assignor to Fridon Manufacturing Limited, Burlington, Ontario, Canada
Filed Jan. 28, 1966, Ser. No. 523,743
13 Claims. (Cl. 15—250.42)

ABSTRACT OF THE DISCLOSURE

In a windshield wiper squeegee assembly wiping and retention portions of the squeegee are joined by a narrower neck portion and the retention portion is held in a groove formed between spaced webs upstanding from a squeegee support of extruded plastic material; the squeegee support has transversely projecting edges, one of which is notched and permits release from and attachment to embracing claws of a pressure-applying superstructure by successively registering the notch with the pairs of claws. In a method of making the assembly the support is formed by cutting from an extruded length of channel section, the squeegee element is engaged in the channel and then the ends of the support are deformed to form stop means limiting movement of the squeegee in the channel and also movement of the support in the superstructure.

---

Figure 1:
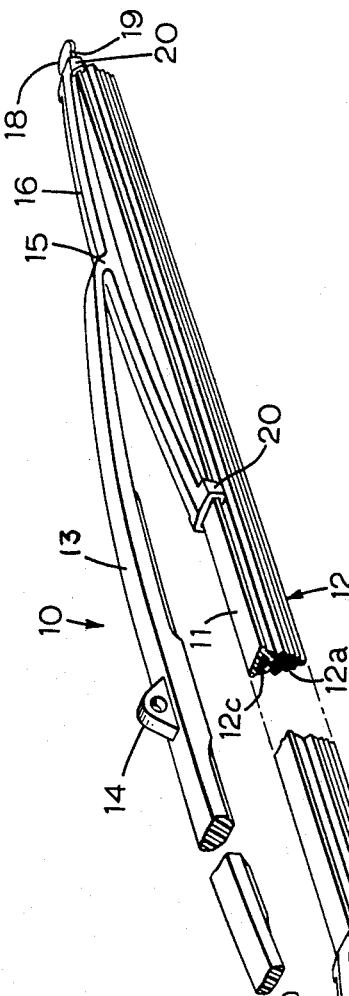

This invention is concerned with improvements in or relating to windshield wiper assemblies, and to windshield wiper squeegee assemblies for use therein.

In a common form of squeegee assembly that has been employed hitherto an elongated squeegee element, formed of a relatively soft elastomeric material, is rendered substantially inflexible in directions generally parallel to the surface to be wiped, while remaining substantially flexible in directions generally perpendicular to said surface, by means of a thin flat squeegee support strip, usually a stainless steel stamping. Such a combination of squeegee element and squeegee support (called herein a squeegee assembly), is mounted by a pressure-applying superstructure or linkage (hereinafter called a superstructure) at one end of a wiper arm that is spring biased toward the surface to be wiped and moves the squeegee thereover. Such a combination of squeegee assembly and pressure-applying superstructure is called herein a windshield wiper assembly.

More specifically, the squeegee element commonly comprises a retention portion and a wiping portion which, as seen in cross-section, are joined by a relatively narrow first neck that permits the wiping portion to deflect sideways relative to the retention portion as the element is wiped over a surface. The retention portion is also provided with a relatively shallow second neck, that is embraced by the thin squeegee support strip, the latter having a central longitudinal slot through which the second neck extends.

Over the years the form of motor vehicle windshields has changed from a flat sheet of glass, to one that is of relatively complex curvature, producing problems in ensuring that the windshield is wiped evenly over the full length of the squeegee element, such even wiping requiring that the wiping pressure on the squeegee element is sufficiently uniform along its length, despite the different curvature of different portions of the element, and despite changes in the curvature as the element is moved over the windshield. To produce such even pressure various arrangements and geometric configurations of superstructure have been proposed hitherto.

In one form of superstructure commonly used hitherto in windshield wiper assemblies for curved windshields a principal yoke is directly attached to the wiper arm, and a plurality of subsidiary yokes or levers are pivoted to the principal yoke and are connected at longitudinally spaced points to the squeegee element and/or the squeegee support. These yokes are of channel form, and are made from stamped sheet metal, so that they are relatively rigid, and rely on their pivoting connections with one another to conform with the perpendicular flexing of the squeegee element as the latter is moved over the wiped surface. The connection between the subsidiary yokes and squeegee support is by means of pairs of opposed claws formed at their respective ends, each pair of claws retentively embracing its adjacent part of the squeegee support.

Proposals have also been made to improve the uniformity of wiping by providing a squeegee support that is non-uniform in its perpendicular flexibility along its length, for example, so that the member is less flexible between its points of attachment with the superstructure than at such points.

Such known windshield wiper assemblies have a number of disadvantages. For example, despite careful design, the wiping is still not as uniform as would be desired, and even a well-designed assembly can easily be ruined from this point of view, because for example, the rigid metal parts are permanently bent or twisted as the assembly is freed by a careless operator from a frozen windshield. Moreover, the pivoted metal parts inherently are noisy as the assembly moves to and fro, and this noise problem increases as the assembly wears and the pivot joints are loosened. To avoid corrosion the metal parts must be of stainless steel, or plated, and glare from this source is frequently a driving hazard. If the squeegee element becomes badly worn there is a real danger of metal parts such as the squeegee support contacting and scratching the windshield. Means must be provided for ready detachment of the squeegee assembly from the superstructure, and such means frequently are relatively complicated requiring special press-studs and the like.

It is an object of the present invention to provide a new squeegee support for use in a windshield wiper squeegee assembly.

It is another object to provide a new windshield wiper assembly.

It is a further object to provide a new windshield wiper assembly comprising an especially simple means for detachably attaching the squeegee assembly and the pressure-applying superstructure.

In accordance with the present invention there is provided a squeegee assembly comprising an elongated squeegee element of a flexible elastomeric material and comprising a wiper portion, a retention portion and a neck portion, the neck portion being of narrower transverse width than the wiping and retention portions and connecting them together, and a cooperating elongated squeegee support member of a plastic material and comprising a body portion of greater width than depth to have less flexibility in directions parallel to the surface to be wiped, and a pair of spaced webs upstanding from the said body portion and embracing the said retention portion of the squeegee element to retain the element and the member in cooperating engagement with one another.

Also in accordance with the present invention there is provided such a squeegee assembly, in combination with a pressure-applying superstructure, the said superstructure comprising at least one leaf spring member of a resilient plastic material and at least two longitudinally-spaced pairs of opposed cooperating claws, the longitudinal spacing of the said two pairs of claws being variable by flexing of the said leaf spring member in directions perpendicular to the surface to be wiped, the said squeegee support being retentively engaged by the said pairs of claws, being slidable longitudinally therein, comprising top means limiting the said longitudinal sliding movement in the claws, and comprising notch means adapted to register with one of the pairs of claws upon flexing of said leaf spring member beyond the normal extent encountered in wiping and adapted upon such registry to permit disengagement of the squeegee support from the respective pair of claws, the said stop means thereafter permitting longitudinal movement of the squeegee support for registry of the notch means with the other pair of claws and subsequent disengagement of the squeegee support therefrom.

Further in accordance with the present invention there is provided a method of making a windshield wiper assembly comprising the steps of forming by an extrusion process from a plastic material an elongated member which has a greater width than depth to have less flexibility in the opposed directions of the said greater width, and which has a pair of spaced webs forming a converging mouth channel upstanding from a face of greater width, cutting said elongated member into shorter lengths, each of which shorter lengths constitutes a respective squeegee support, engaging in the said channel a squeegee element comprising a wiping portion joined to a retention portion by a narrower neck portion so that the said retention portion is embraced by the said webs to retain the squeegee support and the squeegee element in cooperating engagement with one another, and deforming the ends of the squeegee support to provide respective stop means structures limiting endwise movement of the squeegee element in the channel.

Figure 2:
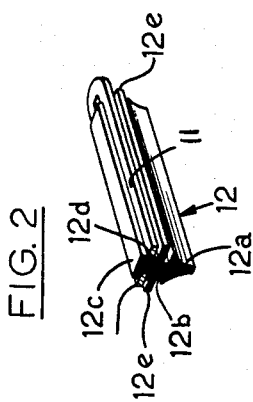
Figure 3:
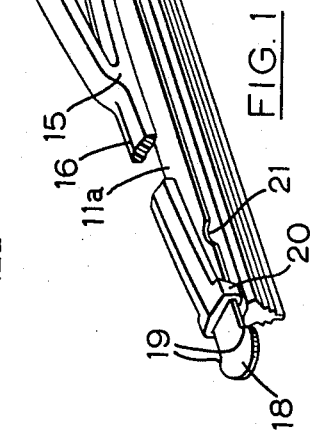
Figure 4:
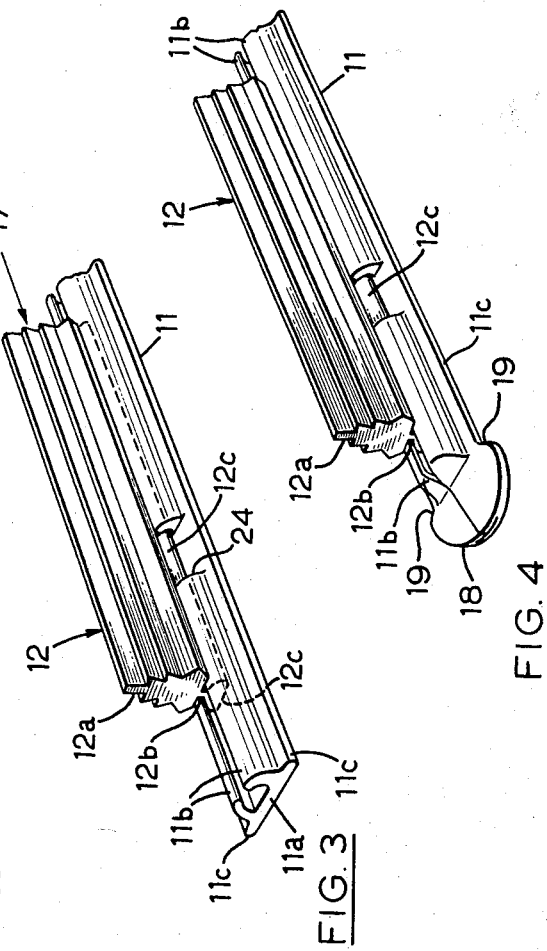

A particular preferred embodiment of the invention will now be described, by way of example, with reference to the accompanyings drawings, wherein:

FIGURE 1 is a perspective view of a windshield wiper assembly, parts thereof being broken away as required to show the cross-section at those points, FIGURE 2 is a similar view of an end part of a prior squeegee assembly, FIGURE 3 is a similar view of an end part of a squeegee assembly in accordance with the invention, and illustrating a step in the process of assembling together the squeegee element and the squeegee support, FIGURE 4 is a similar view to FIGURE 3 and showing in detail the construction of one end of a squeegee assembly, FIGURE 5 is a side elevation illustrating the extent to which the leaf spring members of the pressure-applying superstructure must flex to permit disengagement of the squeegee assembly from the superstructure, FIGURE 6 is a cross-section taken along the line 6–6 of FIGURE 5, and FIGURE 7 is a view similar to FIGURE 6 and illustrating the manner in which the squeegee assembly is disengaged from the superstructure.

Referring now to all except FIGURE 2, the windshield wiper assembly comprises a pressure-applying superstructure having the general reference 10, a squeegee support having the general reference 11, and a squeegee element having the general reference 12.

More specifically, the pressure-applying superstructure comprises an elongated primary yoke lever, or leaf spring member 13, hereinafter referred to as the primary leaf spring member, which is bowed so as to be concave towards the surface to be wiped, and is connected approximately at the mid-point along its length, as by a suitable integral or detachable arm attachment clip 14, with the free end of a wiper arm (not shown) by which the windshield assembly is spring urged in the direction generally perpendicularly toward the surface to be wiped, and is moved over the said surface in directions generally parallel thereto. Each end of the primary yoke member 13 is connected at a respective integral principal flexure portion 15 to a respective elongated secondary yoke, lever or leaf spring member 16, hereinafter referred to as a secondary leaf spring member, approximately at the centre point along the length thereof, each secondary member also being bowed in the same direction as the primary member 13. The superstructure is formed by a moulding operation as a single integral piece from a suitable synthetic resin.

Referring especially to FIGURE 1, it will be seen that the cross-sections of the primary and secondary leaf spring members are much wider in the directions generally parallel to the surface to be wiped (herein called the parallel directions) than they are deep in the directions generally perpendicular to the said surface (herein called the perpendicular directions), so that they flex much more readily in the perpendicular directions than in the parallel directions. The cross-sections of the principal flexure portions 15 also have the same general configuration, so that the deflections of the secondary leaf spring members relative to the primary leaf spring member take place predominatly in the said perpendicular directions.

We have discovered that more uniform wiping is obtained if the squeegee assembly is permitted to have more parallel flexibility than is present in the known prior art assemblies. The reason is at present believed to be that a relatively inflexible assembly accommodates itself to differences in friction encountered along its length by causing the squeegee blade to deflect differently along its length, so that different parts of the element do not have the same wiping attitude and therefore differ in wiping action. If the squeegee support can deflect appreciably then it can to a corresponding degree accommodate these differences, and the squeegee element is able to maintain a more uniform wiping attitude along its length. A limit must however be placed on the sideways flexibility or "chatter" in the parallel or sideways direction will result as the wiper assembly moves over the surface.

It may be noted that even with suitable resins of the highest modulus at present available, such modulus is of the order of about 15 to 40 times less than that of the stainless steels commonly used in the construction of the metal prior art superstructures described above, and with the wiping pressures usually employed perpendicular flexing of the leaf spring members themselves will occur, as is desired to assist in obtaining longitudinally uniform wiping.

Reference may be made to Patent No. 3,176,337 assigned to the same assignee, which specifically describes and claims a windshield wiper assembly in which use is made of such flexing to achieve more uniform wiping. This flexing is also used in windshield wiper assemblies in accordance with this invention to achieve a substantial simplification in the mode of detachably attaching the superstructure to the squeegee assembly, as will be more particularly described below.

FIGURE 2 shows in perspective one end of the above-dscribed known prior art squeegee assembly, and it will be seen that the squeegee element 12 comprises a wiping portion 12a joined by a neck 12b to a retention portion 12c, the retention portion being provided with another neck 12d that is embraced by a thin slotted stainless steel squeegee support 11. The part of the squeegee element between the two necks 12b and 12d is provided with protective ribs 12e that extend far enough sideways to prevent the squeegee support 11 contacting and scratching the windshield surface as the assembly is moved thereover.

Referring especially now to FIGURES 3 and 4, the squeegee element is formed from a suitable soft elastomeric material and comprises a wiping portion 12a, which can be of any suitable cross-section, joined by a neck 12b to a retention portion 12c. The backing member 11 preferably is formed by an extrusion process, and may be made of any suitable synthetic plastic material having the desired physical characteristics, which are extrusion capability, high impact strength at low temperatures, reasonably constant modulus over the usual operating range of temperature, good weatherability, good creep resistance and low cold flow, resistance to solvents and low water absorption. In this embodiment the squeegee support is constituted by a body portion 11a, which is of substantially greater width in the parallel directions than is its depth in the perpendicular directions. Two flanges or ribs 11b are upstanding from the body portions generally parallel to one another, spaced from one another and also spaced from the immediately adjacent longitudinal edges 11c of the body member. The outermost ends of the ribs are turned inwards towards one another and protrude into the grooves adjacent the neck portion 12b of the squeegee element, so that they form with the body portion 11a a channel having a converging mouth or dovetail cross-section. The converging mouthed channel is therefore in retaining embracing engagement with the retaining portion of the squeegee element, the latter preferably having a cross-section such that it is an easy sliding fit into the channel, It will be appreciated that the ribs 11b and the body portion 11a may also be regarded as constituting two continuous opposed cooperating jaws which embrace the said retaining portion 12c. If desired, the extrusion operation can be so arranged that the backing member is somewhat concave towards the upstanding ribs 11b, and a squeegee support of this form is formed to give more uniform wiping pressure at the centre of the wiper assembly.

It is at present believed that the ability of the squeegee element to slide freely in the channel, but without excessive sideplay, is of importance in obtaining uniform wiping, in that it at least reduces the tendency of the squeegee element to buckle in the parallel directions as its perpendicular curvature changes in moving over a complex curved windshield surface. For the same reason the channel is made slightly longer than the squeegee element, so that the latter is capable of corresponding endwise movement therein.

In the commercial production of the wiper blade assembly the continuous extruded squeegee support material is cut into appropriate length sections, and each squeegee element is slid into the channel of the associated length, as indictaed by the arrow 17 in FIGURE 3, such an operation being readily capable of performance by automatic machinery. The side walls at the two ends of the channel are then closed permanently together by any suitable deforming operation, e.g. hot or cold pressing, to form an end structure 18 illustrated most clearly in FIGURE 4, so that the squeegee element is held against any substantial endwise movement therein. The deforming operation is also arranged to spread the end structure 18 sideways beyond the edges 11c and form a pair of shoulders 19, which extend outwardly in said parallel directions from the respective protruding edges 11c for a purpose described in detail below.

Means must be provided for so mounting the squeegee assembly on the superstructure that the latter can deflect as required in the said vertical directions, while permitting the squeegee element to remain in contact with the surface over its full length. In this embodiment such means comprise a plurality of pairs of opposed cooperating claws 20, each mounted at a respective free end of the secondary leaf spring members 16. Each pair of claws closely embraces the immediately adjacent part of the edge portions 11c of the squeegee support, but permits the latter to slide freely longitudinally therein without appreciable sideways play, so that the jaws can thereby move freely along the squeegee support as the members 13 and 16 flex with the movement of the wiper assembly over the surface. The relative endwise movement in the jaws is limited by the engagement of each endmost pair of jaws with the nearby shoulders 19 of the respective structure 18, the shoulders being too wide to pass through the jaws.

All that is required to permit disengagement of the structure 10 and the wiper blade assembly is the provision of a single notch 21 in one edge portion 11c e.g. by a striking cutting or punching operation, at a location which can only be reached by the immediately adjacent endmost pair of jaws 20 when the superstructure is deflected very much beyond the extent that could possibly be met in normal operation, e.g. as illustrated in FIGURE 5.

For example, the operator can hold the ends of the superstructure in respective hands, the hand at the left end (as seen in FIGURE 5) holding only the superstructure while the other hand simultaneously holds the superstructure and pushes the adjacent stop 19 against the corresponding claws 20; as the assembly is bent arcuately as illustrated in FIGURE 5 the backing member must assume a smaller radius than the superstructure, causing the other end claws 20 to move away from the associated stop 19 until they register with the notch. In another method the superstructure is held firmly with one hand at the clip 14, while the backing member is grasped firmly with the other hand and pulled endwise relative to the superstructure until the required registry is obtained, one or both of the secondary members 16 and its adjacent end of the primary member bending the requisite amount for this to happen.

The width of the body portion 11a at the notch 21, and the length of the notch 21, are such that the associated jaws 20 in register therewith, as illustrated in FIGURES 5 and 6, the immediately adjacent portion of the squeegee assembly can be tilted as indicated by the arrow 22 in FIGURE 7 to disengage the notched edge portion 11c from the jaws, and can then be moved as indicated by the arrow 23 in FIGURE 7 to disengage the other unnotched edge portion. The squeegee assembly can now be moved endwise in the remaining jaws 20 until the notch 21 registers with the next pair thereof, whereupon the disengagement procedure is repeated, and so on until the assembly is completely disengaged from the superstructure. The procedure for the engagement of the assembly and superstructure is of course the reverse of the disengagement procedure just described. It will be appreciated that such a simple engagement and disengagement procedure is only possible because the flexing of the members 13 and 16 permits a change in the effective lengths thereof, and thus of the distances between the associated pairs of claws.

In normal operation the squeegee element becomes worn by its frictional engagement with the wiped surface, while the squeegee support and the superstructure are only subjected to slower and less severe wear conditions of temperatuer changes, exposure to sunlight etc. In known prior art assemblies it is customary to replace both squeegee element and squeegee support when the former is worn, because of the difficulty of separating the two without bending the squeegee support, In squeegee assemblies in accordance with this invention it is possible to provide an especially simple means for separating the two, such means being shown in FIGURE 4 and comprising notches 24 in both of the ribs 11b extending down to the body portion 11a, the notches being close to one end of the squeegee support. The highly flexible squeegee element can be compressed by hand in the longitudinal direction until the adjacent end is in register with the notches 24, whereupon the said end can be disengaged from the channel and thereafter the whole squeegee pulled therefrom through the notches. A new squeegee can be inserted in the backing member channel by reversing the above described sequence of operations. It will also be noted that the removal and replacement can be effected with the squeegee support mounted in the superstructure.

It is an unexpected advantage of the present invention that the wiping obtained appears to be much more uniform than has been obtained with equivalent prior art squeegee assemblies using a backing member as illustrated by FIGURE 2, especially under sub-standard wiper arm loads such as are obtained when the wiper arm spring has deteriorated and lost strength. No specific reasons for this improved performance can be advanced at the present time, but in addition to the explanation advanced above of the possible function of the increased flexibility in the parallel directions, it may be that thicker backing member of more resilient plastic material is much more efficient than the thinner prior art members of less resilient stainless steel in this regard.

Referring again to FIGURE 2, it will be seen that the need to provide the protective extensions 12e of the squeegee element results in an element of wide profile. Such extensions are not required with a squeegee assembly of this invention since the plastic squeegee support is sufficiently soft not to scratch the windshield if it should come in contact therewith, and a narrower profile element can be used. Besides the saving in expensive elastomer material that this entails, the narrower profile does assist in avoiding the edge wrinkling referred to above, and in fact it has been found that our assemblies do not wrinkle as much at the wiping edge as prior art assemblies when curved to the same extent; this is an important factor toward the desired goal of uniform wiping of curved surfaces.

The preferred extruded backing member is self-lubricating and, moreover, is more resilient than a metal backing member and can be made of materials that will not take a permanent set even when severely deformed, such as happens when the squeegee becomes frozen to the windshield and is forcibly and carelessly freed therefrom. It may be noted that even when the windshield wiper is not in use the neck portion of the squeegee element has highly stressed parts since the wiping portion rests at an angle to the retention portion; in our new assemblies this neck portion is completely screened by the embracing support member ribs and protected against the deleterious effects of sunlight.

In general, a windshield wiper assembly in accordance with the invention results in a much lighter unit, with a desired reduction in inertia loads, especially at wipe reversal and at the higher wiper speeds now in use, and with a consequent lower mechanical loading of the wiper motor and connecting linkage. The absence of metal parts and wearable pivoting linkages gives an overall decrease in the noise level of operation, and there is also the possibility of compounding the plastic materials with different colouring materials and surface-texture-producing materials to avoid glare and provide colour matching with the remainder of the automobile.

In the specific pressure-applying superstructure shown and described the members 13 and 16 have been described as leaf spring members, since in this construction they clearly function as such. However, in other embodiments the connecting members between the claws 20 and the arm atachment clip 14 may be more precisely referred to as yokes or levers, but for convenience in terminology the term leaf spring member has been used in the claims as encompassing leaf spring members, yokes and levers. The superstructure disclosed is particularly applicable to assemblies for the wiping of curved windshields, but it is also contemplated that the squeegee assembly can be employed in combination with a superstructure intended for the wiping of flat windshields and in which the superstructure supports the squeegee assembly along its entire length.

What I claim is:

1. A windshield wiper squeegee assembly comprising an elongated squeegee element of a flexible elastomeric material and comprising a wiping portion, a retention portion and a neck portion, the neck portion being of narrower transverse width than the wiping and retention portions and connecting them together, and a cooperating elongated squeegee support member of a plastic material and comprising a body portion of greater width than depth to have less flexibility in directions parallel to the surface to be wiped than in directions perpendicular thereto, a pair of spaced webs upstanding from the said body portion to embrace the said retention portion of the squeegee element and retain the squeegee element and the squeegee support member in cooperating engagement with one another, body edge portions projecting transversely outwards respectively beyond the said spaced webs to be embraced in retaining engagement by pairs of opposed cooperating claws of an associated cooperating pressure-applying superstructure, and notch means in at least one of said body edge portions permitting disengagement of the squeegee support member from a respective pair of claws upon registration of the last-mentioned pair of claws with the said notch means upon flexing of the assembly beyond its normal operating extent, and permitting subsequent disengagement of the squeegee support member from the remaining pairs of claws of the superstructure by endwise movement of the squeegee support member relative to the superstructure to cause corresponding registration of said remaining pairs of claws with the notch means.

2. An assembly as claimed in claim 1, wherein the said squeegee element is freely slidable to a predetermined extent longitudinally of the squeegee support member between the said spaced webs.

3. An assembly as claimed in claim 1, and comprising notch means in the said body portion webs of the squeegee support member extending to the said base portion and disposed adjacent one end of the backing member, the squeegee element being compressible longitudinally until the respective end thereof registers with the said notch means and the element thereafter being disengageable from the channel and withdrawable therefrom through the said notch means.

4. An assembly as claimed in claim 1, wherein at the ends of the said squeegee support member at least the said webs are deformed to provide respective stop means structures limiting endwise movement of the squeegee element in its said retained engagement with the squeegee support member.

5. An assembly as claimed in claim 4, wherein each said stop means structure provides a pair of shoulders extending transversely from the body portion in the said parallel directions and constituting other stop means for limiting endwise movement of the squeegee support member in the claws of the said associated pressure-applying superstructure.

6. An assembly as claimed in claim 1, wherein the said squeegee support member is a cut length of a longer member formed by an extrusion operation.

7. An assembly as claimed in claim 6, wherein the said longer member is formed by the extrusion operation to be slightly concave with respect to the face thereof from which the said ribs extend.

8. An assembly as claimed in claim 1, in combination with the said pressure-applying superstructure, the said superstructure comprising at least one leaf spring member of a resilient plastic material and at least two longitudinally-spaced pairs of opposed cooperating claws carried by the leaf spring member, the longitudinal spacing of said two pairs of claws being variable by flexing of the said leaf spring member in directions perpendicular to the surface to be wiped, the said squeegee support member being retentively engaged by the said pairs of claws and being slidable longitudinally therein, the said squeegee support member comprising stop means limiting the said longitudinal sliding movement thereof in the claws, and wherein the said notch means are adapted to register with one of the pairs of claws upon flexing of the said leaf spring member beyond the normal extent encountered in wiping and adapted upon such registry to permit disengagement of the squeegee support member from the respective pair of claws, the said stop means thereafter permitting longitudinal movement of the squeegee support member for registry of the notch means with the other pair of claws and subsequent disengagement of the squeegee support member therefrom.

9. An assembly as claimed in claim 8, wherein the said superstructure comprises a primary leaf spring member of resilient plastic material and adapted to be connected to a wiper arm, and two secondary leaf spring members, each of resilient plastic material, each connected to a respective end of the primary member by a flexure portion, and each having at its free ends a pair of opposed cooperating claws for retaining engagement with the squeegee support member, the longitudinal spacing of the claws being variable by flexing of the primary member and of the associated secondary member.

10. An assembly as claimed in claim 9, wherein the said primary and secondary members, the said connecting flexure portions and the said pairs of claws are formed together as a unitary structure by a single moulding operation.

11. A method of making a windshield wiper assembly comprising the steps of forming by an extrusion process from a plastic material an elongated member which has a greater width than depth to have less flexibility in the directions of the said greater width than in the directions perpendicular thereto, and which has a pair of spaced webs forming a converging mouth channel upstanding from a face of greater width and cutting said elongated member into shorter lengths each of which shorter lengths constitutes a respective squeegee support member, engaging in the said channel a squeegee element comprising a wiping portion joined to a retention portion by a narrower neck portion so that the said retention portion is embraced by the said webs to retain the squeegee support member and the squeegee element in cooperating engagement with one another, and deforming the ends of the squeegee support member to provide respective stop means structures limiting endwise movement of the squeegee element in the channel.

12. A method as claimed in claim 11, and including the additional steps of providing in an edge portion of the squeegee support member notch means for disengagement of the backing member from embracing opposed pairs of claws of an associated pressure-applying superstructure.

13. A method as claimed in claim 11, wherein the said ends are deformed to provide stop means structures comprising a pair of shoulders extending transversely therefrom to constitute other stop means for limiting endwise movement of the squeegee support member in embracing opposed pairs of claws of an associated pressure-applying superstructure.

References Cited
UNITED STATES PATENTS

| | | | |
|---|---|---|---|
| 2,966,692 | 1/1961 | Zaiger | 15—250.36 |
| 3,121,903 | 2/1964 | Ludwig | 15—250.42 |
| 3,176,337 | 4/1965 | Glynn | 15—250.42 |
| 3,177,514 | 4/1965 | Wise | 15—250.42 |

CHARLES A. WILLMUTH, *Primary Examiner.*